US009852433B2

(12) United States Patent
Patel et al.

(10) Patent No.: US 9,852,433 B2
(45) Date of Patent: Dec. 26, 2017

(54) SYSTEMS AND METHODS FOR PREDICTING OCCURRENCES OF CONSUMERS RETURNING PURCHASED DEVICES

(71) Applicant: Motorola Mobility LLC, Libertyville, IL (US)

(72) Inventors: Neal H. Patel, San Francisco, CA (US); Hal R Varian, Danville, CA (US); Jeffrey D Oldham, San Jose, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 445 days.

(21) Appl. No.: 13/923,605

(22) Filed: Jun. 21, 2013

(65) Prior Publication Data

US 2014/0337092 A1    Nov. 13, 2014

Related U.S. Application Data

(60) Provisional application No. 61/820,885, filed on May 8, 2013.

(51) Int. Cl.
*G06Q 30/02*    (2012.01)
*G06Q 30/00*    (2012.01)
(Continued)

(52) U.S. Cl.
CPC ... *G06Q 30/0201* (2013.01); *G06Q 10/06375* (2013.01); *G06Q 10/0837* (2013.01); *G06Q 30/014* (2013.01); *G06Q 30/016* (2013.01)

(58) Field of Classification Search
CPC .......... G06Q 30/0255; G06Q 30/0235; G06Q 10/105; G06Q 10/103; G06Q 10/067;
(Continued)

(56) References Cited

U.S. PATENT DOCUMENTS 6,536,659 B1*   3/2003   Hauser ................... G06Q 30/06
                                                                235/375
7,814,029 B1    10/2010  Siegel
(Continued)

OTHER PUBLICATIONS

Davis et al, Return Policies and the Optimal Level of "Hassle", 1998, Journal of Economics and Business, pp. 445-460.*
(Continued)

*Primary Examiner* — Ivan R Goldberg
*Assistant Examiner* — Uche Byrd
(74) *Attorney, Agent, or Firm* — Marshall, Gerstein & Borun LLP (57) ABSTRACT

Systems and methods are provided for reducing consumer electronic device returns. According to various aspects, a server receives (505) usage data of an electronic communication device by a consumer. The server examines (510) existing usage indicating correlations between various usage factors of additional devices and return incidents of the additional devices, and calculates (515) individual probabilities of return for the various usage factors and a total probability of return for the electronic communication device. In embodiments, if any of the individual probabilities or the total probability meets or exceeds a threshold probability, the server contacts (535) at least one of the electronic communication device or the consumer.

8 Claims, 8 Drawing Sheets

(51) Int. Cl.
*G06Q 10/06* (2012.01)
*G06Q 10/08* (2012.01)

(58) Field of Classification Search
CPC .. G06Q 30/02; G06Q 10/06315; G06Q 40/00;
G06Q 30/00; G06Q 30/06; H04Q 7/20
USPC .............................................. 705/7.11–7.42
See application file for complete search history.

(56) References Cited

U.S. PATENT DOCUMENTS

| | | |
|---|---|---|
| 8,311,895 B1 | 11/2012 | Murugan et al. |
| 2002/0019777 A1* | 2/2002 | Schwab ............. G06Q 10/0837 705/26.41 |
| 2002/0019785 A1* | 2/2002 | Whitman ............. G06Q 10/087 705/28 |
| 2003/0126033 A1* | 7/2003 | Evans .................... G06F 21/10 705/26.1 |
| 2004/0143518 A1 | 7/2004 | Siegel |
| 2009/0171815 A1 | 7/2009 | Wang et al. |
| 2012/0030060 A1* | 2/2012 | Lu et al. ....................... 705/26.7 |
| 2012/0196571 A1* | 8/2012 | Grkov et al. ................. 455/411 |

OTHER PUBLICATIONS

Peter Bright, "August Browser Stats: Safari Dominates Mobile Browsing", Ministry of Innovation/Business of Technology, Sep. 9, 2011, 5 pages.
International Search Report and Written Opinion for Application No. PCT/US2014/035392, dated Feb. 27, 2015.

* cited by examiner

DETAILED DESCRIPTION

SYSTEMS AND METHODS FOR PREDICTING OCCURRENCES OF CONSUMERS RETURNING PURCHASED DEVICES

FIELD

This application generally relates to predicting occurrences of consumers returning purchased devices. In particular, the application relates to platforms and techniques for examining usage histories associated with electronic devices to identify correlations between various usage patterns and instances of consumers returning the electronic devices.

BACKGROUND

With advancing technology and the general increased prevalence of a wide variety of electronic devices, consumers are prone to return purchased devices for a variety of reasons. For example, some consumers may not understand how to use some features and thus return their devices due to user frustration at an inability to use that feature. Further, some device hardware components can fail at unexpected rates, certain software may not operate correctly, and lags in the supply chain information flow can result in devices being shipped to the wrong locations or at the wrong rate.

Manufacturers or suppliers incur costs whenever a device is returned, such as through general customer service costs, restocking costs, costs associated with refurbishing and re-selling the device, and other costs. Accordingly, there is an opportunity for implementing techniques for reducing instances of consumers returning purchased devices.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Systems and methods proactively contact consumer users based on a usage data analysis of a plurality of devices. The systems and methods aggregate and analyze various usage and return data of a plurality of electronic devices. In particular, the usage data can include data typically captured or sensed during setup of a recently-purchased electronic device, as well as other usage data captured during normal operation of the electronic device. Further, the return data can include instances of at least some of the electronic devices being returned.

According to embodiments, the systems and methods can analyze and create statistical models for the usage and return data to determine correlations between some elements of the usage data with the return instances. For example, the systems and methods can determine that a particular period of device inactivity or idle time is correlated to (and has a probability of leading to) the purchasing consumer returning the device. The systems and methods can determine that a particular data threshold or characteristic for a given usage factor has a high correlation to devices that have been returned and a low correlation to devices that have not been returned. It should be appreciated that the systems and methods can perform the analyses and modeling according to various known techniques and models, such as linear and non-linear regression, multinomial logit, probit, multinomial probit, and Poisson regression.

According to embodiments, the systems and methods can receive usage data corresponding to a recently-purchased electronic device that is purchased by a consumer. The systems and methods can compare the received usage data to the existing usage and return data, and correlations and probabilities thereof. Based on the comparison, the systems and methods can identify usage metrics corresponding to various usage factors of the recently-purchased device. Further, the systems and methods can perform calculations using the usage metrics and the correlations of the existing data to determine a probability that the consumer will return the device. In various implementations, the systems and methods can contact the consumer via various channels and in an appropriate manner in a proactive attempt to remedy issues that are commonly associated with the detected usage behavior. For example, if the detected usage behavior indicates a low level of application downloads from an application distribution platform, the systems and methods can initiate a customer service call to guide the consumer through downloading an application. In some embodiments, the systems and methods can contact the user in an appropriate manner if the probability of return meets or exceeds a threshold probability.

It should be noted that the disclosures in this specification are made and intended to be interpreted to their broadest extent under the patent laws, and that while the systems and methods described herein may be employed broadly in numerous applications and embodiments consistent with their capabilities, nothing in this disclosure is intended to teach, suggest, condone or imply noncompliance with any other law or regulation that may be applicable to certain usage factors or implementations of the systems and methods. For example, while the systems and methods disclosed herein are technologically capable of numerous data collection, analysis, and communication functionality with respect to device users, such capabilities and functionalities should not be construed as a teaching, recommendation, or suggestion to use such capabilities and functionalities in a manner that does not comply with all applicable existing laws and regulations, including without limitation, applicable state and common law privacy laws, the Fair Credit Reporting Act (FCRA), the Equal Credit Opportunity Act (ECOA), or the Health Insurance Portability and Accountability Act (HIPAA). Again, such broad disclosure is intended for compliance with and interpretation under the patent laws and regulations.

It should be appreciated that the systems and methods contemplate various channels for contacting the consumers in an appropriate manner. In some cases, the systems and methods can place an outbound call to the device, such as if the device is a smartphone. In other cases, the systems and methods can send a message to a contact channel associated with the consumer, such as an SMS to a phone number, a message to an email address or a physical address, or others. In further cases, the systems and methods can install software to or perform an update to software installed on the electronic device, such as an operating system upgrade, a custom ROM flash, or others.

The functionalities of the described systems and methods reduce instances of returned products. Particularly, the functionalities enable the systems and methods to proactively contact consumers who have recently purchased electronic devices in an effort to remedy problems or issues identified in usage data. This contact can help consumers understand various functionalities or features of the electronic device, can help consumers set up accounts, can fix software issues with the electronic device, and/or can alleviate other issues. By reducing the instances of returned electronic devices, manufacturers and/or sellers of the electronic devices will incur fewer costs associated with returns. Additionally, the manufacturers and/or sellers can pass the cost savings down to the consumers by lowering prices of the electronic devices. It should be appreciated that other benefits of the discussed systems and methods are envisioned.

Figure 1:
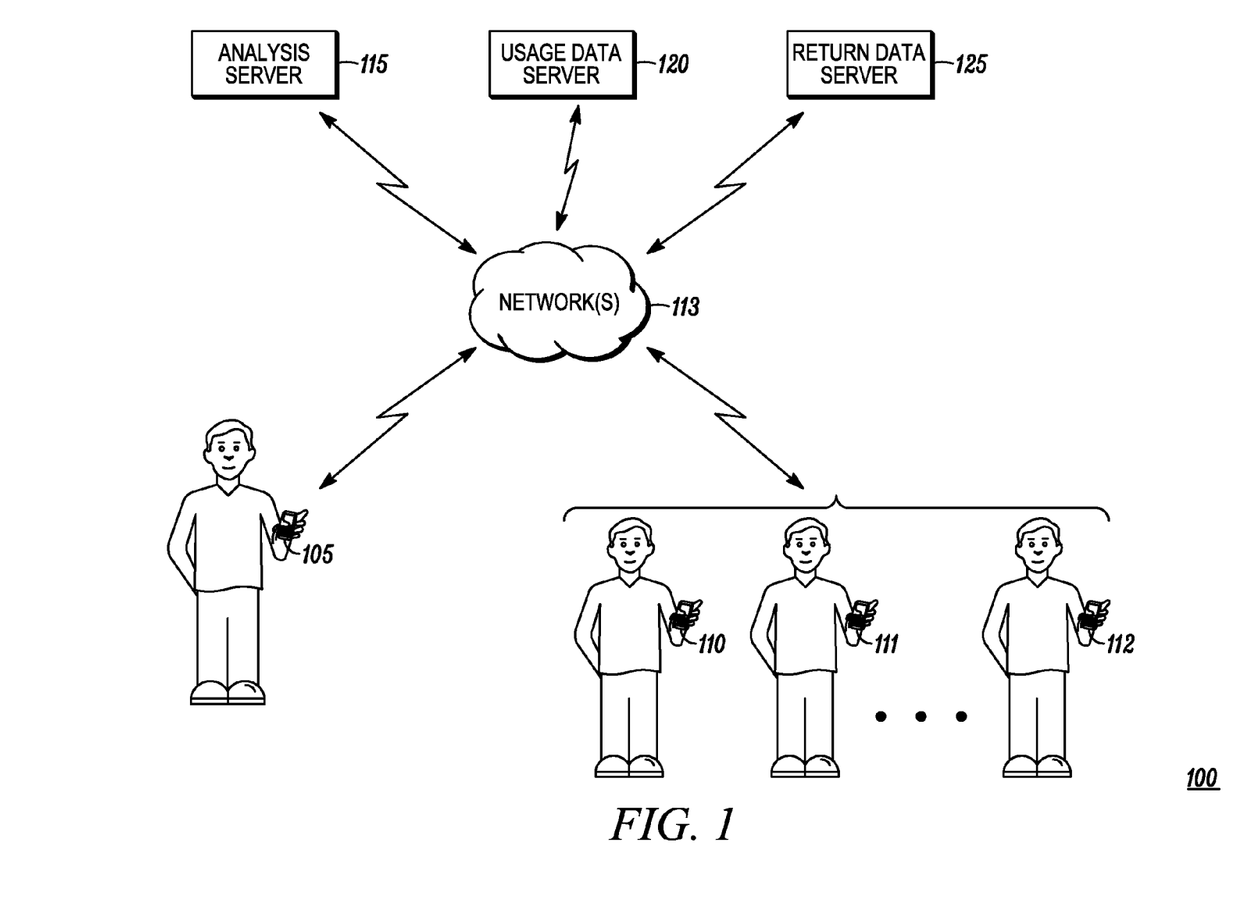
FIG. 1 illustrates an example environment including various components for predicting return occurrences in accordance with some embodiments.

FIG. 1 depicts a general exemplary environment 100 including various components and entities configured to facilitate the functionalities as described herein. It should be appreciated that the environment 100 is merely an example and can include fewer or more components and entities, as well as other various combinations of components and entities.

As shown in FIG. 1, the exemplary environment 100 includes electronic devices 105, 110, 111, 112 configured for use by respective users. For ease of explanation, a "subject" consumer operates electronic device 105 and "background" consumers operate the other three electronic devices 110, 111, 112. Of course, any of the devices may actually be considered the "subject" device with any number of other devices being "background" devices. Further, the environment 100 includes an analysis server 115, a usage data server 120, and a return data server 125. In embodiments, the analysis server 115, the usage data server 120, and the return data server 125 can be combined into a single server or component. The electronic devices 105, 110, 111, 112 can be any device having a combination of software and hardware components, and can connect to and communicate with any of the analysis server 115, the usage data server 120, and the return data server 125 via a network 113 such as, for example, a wide area network (WAN), a local area network (LAN), a personal area network (PAN), or other networks. The network 113 can facilitate any type of data communication via any wired or wireless standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others).

It should be appreciated that each of the analysis server 115, the usage data server 120, and the return data server 125 can connect to and communicate with each other, for example via the network 113. Similarly, each of the electronic devices 105, 110, 111, 112 can connect to and communicate with each other, for example via the network 113 or via peer-to-peer communication.

The components of the environment 100 can implement the systems and methods that facilitate and manage the usage identification calculation and analysis, and proactive return-prevention functionalities. In embodiments, the electronic devices 105, 110, 111, 112 can be purchased, owned, or otherwise used by the respective consumers. As shown in FIG. 1, there are three background electronic devices 110, 111, 112, although it should be appreciated that the functionalities can be implemented with other amounts of background electronic devices. According to embodiments, the electronic devices 105, 110, 111, 112 can each have an associated identification, such as an International Mobile Station Equipment Identity (IMEI). Further, the electronic devices 105, 110, 111, 112 can send identification data along with various usage data to the usage data server 120. In embodiments, the usage data can be data associated with a setup of any of the electronic devices 105, 110, 111, 112 such as any server access data (such as email setup or network access data), base station connection data, and/or other data.

Further, in embodiments, the usage data can be other data that can be gathered during operation of the electronic device, such as download activity from a digital application distribution platform such as the Google Play platform offered by Google, Inc. It should be appreciated that other usage data is envisioned such as battery charging activity, radio power drain, display power drain, call frequency, data transfer rate, processor activity, email server connection attempts, software application activity, idle time, region information, model information, build information, and other data. The usage data server 120 can receive the identification data and usage data, and can associate the corresponding usage data with the identification data of the corresponding electronic device 105, 110, 111, 112.

The usage data server 120 can receive additional usage data from the background electronic devices 110, 111, 112 (such as on a periodic or "as requested" basis) or from additional electronic devices, and can update the usage data accordingly. According to embodiments, the analysis server 115 can interface with the usage data server 120 to retrieve the usage data and parse the usage data according to certain non-usage factors and attributes. For example, the analysis server 115 can parse the data by geographic or market region (e.g., North America, Latin America, China, Europe, North Africa, etc.), service provider, hardware model, or software build. For further example, the analysis server 115 can parse the usage data according to various usage factors such as battery charge data, idle time, and other usage behaviors as discussed herein. It should be appreciated that other usage factors and parsing attributes are envisioned.

The analysis server 115 can interface with the return data server 125 to retrieve or otherwise identify return incidents associated with any of the background electronic devices 110, 111, 112. In embodiments, if a consumer returns an electronic device, the appropriate entity (e.g., retail store, receiving center, etc.) can update the return data server 125 to reflect that the electronic device was returned. Either of the analysis server 115 or the usage data server 120 can associate which usage data corresponds to the returned electronic device.

According to embodiments, the analysis server 115 can create aggregate usage and return data from individual device usage data received from the background electronic devices 110, 111, 112 as well as the return incidents from the return data server 125. The analysis server 115 can analyze the aggregate data to determine or identify particular usage behaviors and metrics thereof. In embodiments, the usage factors and metrics thereof can be attributed to user interactions with the electronic devices or to activity by the electronic devices themselves. For example, a user interaction can correspond to a user initiating attempts to connect to an email server and a device interaction can be the electronic device itself automatically connecting to a roaming network.

Through statistical modeling, the analysis server 115 can identify correlations between the various usage factors (and metrics thereof) and the return incidents. In particular, the electronic devices that have been returned can have usage metrics that correlate to a certain range and the electronic devices that are not returned can have usage metrics that correlate to a different range. For example, analysis server 115 can determine that a low processor activity rate has a strong correlation to the return incidents and a high processor activity has a weak correlation to the return incidents. For further example, the analysis server 115 can determine that a 36-hour period of inactivity, or that at least ten failed attempts to connect to an application distribution service, are exhibited in the usage data of a high percentage of the returned electronic devices and in a low percentage of electronic devices that are not returned.

In embodiments, the analysis server 115 can calculate respective coefficients to the various usage factors based on the correlation analysis. The analysis server 115 can calculate the coefficients based on the usage data metrics and their correlations to the device return activity, whereby the combination of the each coefficient and its respective usage data metrics can approximate a probability that a consumer will return the electronic device based on that particular usage. In embodiments, the analysis server 115 can update the usage data and data thereof (e.g., metrics and coefficients) as more usage data is received from the electronic devices 110, 111, 112 and as more return data is received from the return data server 125 (i.e., as more background electronic devices are returned).

It should be appreciated that the analysis server 115 can employ various calculations or techniques to calculate the probability of return and associated coefficient for an identified usage pattern. In embodiments, the analysis server 115 can continually or on a periodic or "as requested" basis update the probabilities and associated coefficients based on usage data indicating recurring usage patterns. For example, if the usage data indicates few but consistent email server connection failures with returned devices, the analysis server 115 can update the corresponding coefficient to accordingly reflect a higher probability of return. It should be appreciated that other scenarios and calculations are envisioned.

According to embodiments as depicted in FIG. 1, the usage data server 120 can receive usage data from the subject electronic device 105. Further, the analysis server 115 can retrieve and examine the received data to identify particular usage behaviors and calculate metric values for those usage behaviors. The analysis server 115 can calculate individual probabilities of return for each of the usage factors based on the respective metric values and coefficients for the respective usage factors, and can calculate a total probability of return based on summing (or via other calculations) the individual probabilities of return. Further, the analysis server 115 can compare the individual probabilities of return to a single-factor threshold and/or the total probability of return to a cumulative threshold probability to determine whether any probability of return meets or exceeds the corresponding threshold probability. It should be appreciated that the analysis server 115 (or a user thereof) can set the threshold probabilities to any number or amount.

Various triggers can be defined based on the threshold probabilities. For example, if a cumulative probability meets or exceeds a cumulative threshold probability, or if one or more individual probabilities exceeds a single factor threshold probability for a predefined period of time, the analysis server 115 can facilitate contacting a user of the electronic device 105. In some cases, the analysis server 115 can place an outbound voice call, video chat, instant message, or the like, or otherwise facilitate such contact by other systems or components, to the electronic device 105. In other cases, the analysis server 115 can remotely install software code on the electronic device 105, such as via an over-the-air upgrade, flashing a custom ROM or update patch, or via other installations. In still further cases, the analysis server 115 can send a message to a contact channel associated with the user. For example, the contact channel can be an email or other electronic messaging address, a home address for postal or courier mail, a work address for corporate accounts, or the like. The message can include an offer for a peripheral item that is mechanically and/or electrically compatible with the electronic device 105. For example, the peripheral item can be a Bluetooth® accessory, a mechanical holster, an audio dock, or other items.

In some embodiments, such as after contacting the user of the electronic device 105, the analysis server 115 can determine that the user did not, in fact, eventually return the electronic device 105. The analysis server 120 can update the usage data to reflect that contacting the user resulted in the user not returning the electronic device. In some cases, the analysis server 115 can create or update a data record associated with a probability that contacting the user will result in an avoided return for a specific usage. In other cases, the analysis server 115 can update the coefficient associated with the specific usage such that the associated probability of return is reduced.

Figure 2:
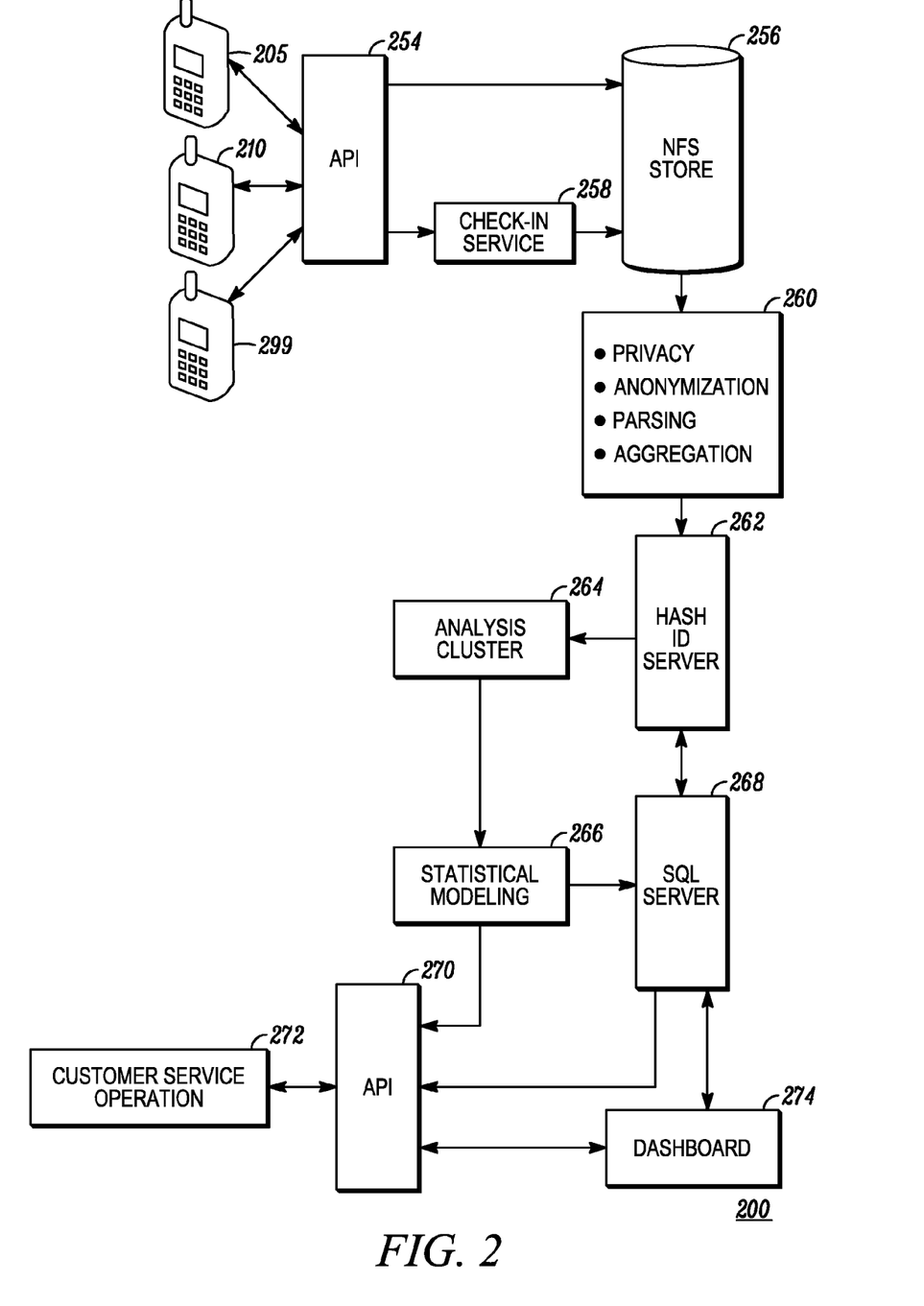
FIG. 2 illustrates a particular example environment in accordance with some embodiments.

FIG. 2 depicts a particular exemplary environment 200 including various components and entities configured to facilitate the functionalities as described herein. It should be appreciated that the environment 200 is merely an example and can include fewer or more components and entities, as well as other various combinations of components and entities.

As shown in FIG. 2, the exemplary environment 200 provides for exchange of data with a plurality of devices 205, 210, 299 as contemplated herein through an API 254 or other system interface. The API is in communication with a database such as a Network File System (NFS) store 256 to facilitate storage of the device and usage data retrieved from or otherwise obtained and associated with the devices 205, 210, 299. While illustrated as a direct interface with the devices 205, 210, 299, it should be understood that various data relating to each device or its usage may be obtained through carrier network architecture, databases, registry dips, or other functionality, such as for example, location or presence data from requests or access to one or more databases or registries, such as an HLR or VLR. In the illustrated embodiment, a check-in service 258 may be implemented as part of the system as an additional source of data.

As schematically illustrated at 260, data that is retrieved, collected, and stored in the NFS store is appropriately treated for use within the system, including with regard to privacy concerns relating to the users of the devices 205, 210, 299. Such treatment may include anonymization, parsing, and aggregation of the data for use within the system.

A hash ID server 262 provides appropriate linking between a user or user account and the device 205, 210, 299 if needed and permitted. Other hash functions may be employed as well as are known in the art. It is contemplated that at least one device 299 is returned and the returned device's usage data can be analyzed against the usage data of other devices 205, 210 to calculate probabilities for return of the other devices 205, 210.

Data associated with the devices 205, 210, 299 along with data associated with a plurality of other devices, may be passed to an analysis cluster 264 and used in conjunction with statistical modeling as schematically illustrated at 266 and as contemplated and described in more detail herein to identify one or more characteristics or correlations between the data and device return probability. During the computations within the analysis cluster 264 and assessments within the statistical modeling 266, the usage data may remain anonymous.

In the illustrated embodiment, an SQL server 268 is in communication with the statistical modeling output so that it can be leveraged by the system as described herein. The SQL server 268 is also in communication with the Hash ID server 262 to, in appropriate circumstances, provide a link between device data that may have been flagged based on analysis of the data and the appropriate user or user account associated with the device. As illustrated in FIG. 2, the SQL server 268 is also in communication with an API or the interface 270, which allows communication and integration with a customer service operation schematically illustrated at 272.

A dashboard 274 or other interface may also be provided between the API 270 and the SQL server 268 to initiate requests to the customer service operation 272 for appropriate treatment of and interaction with a user of a device that has been flagged or otherwise identified as exceeding a predetermined threshold of probability of return as contemplated and described herein.

Figure 3:
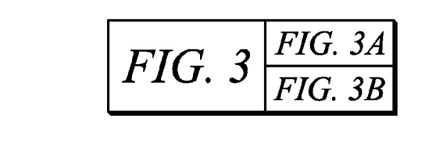
FIGS. 3A and 3B illustrate an example diagram for reducing return occurrences in accordance with some embodiments.
Figure 3A:
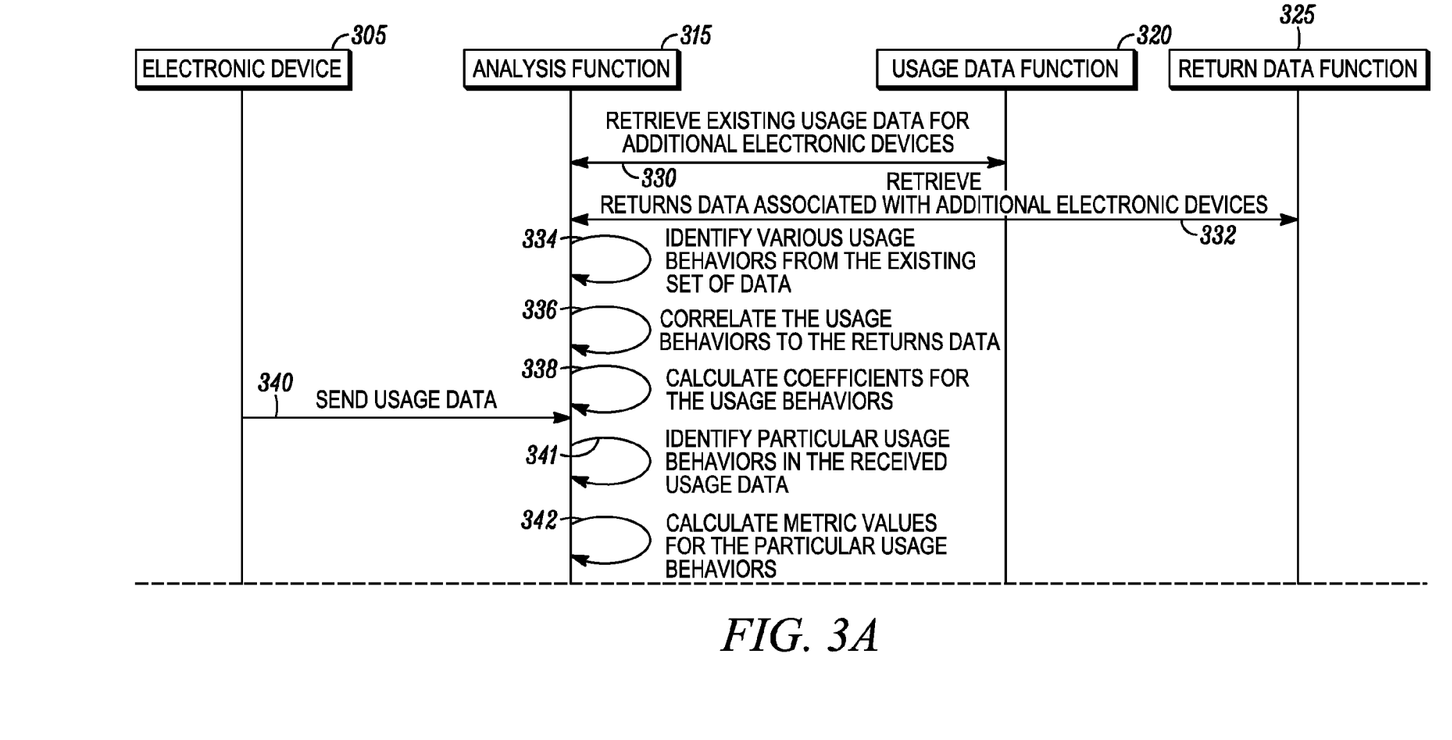
Figure 3B:
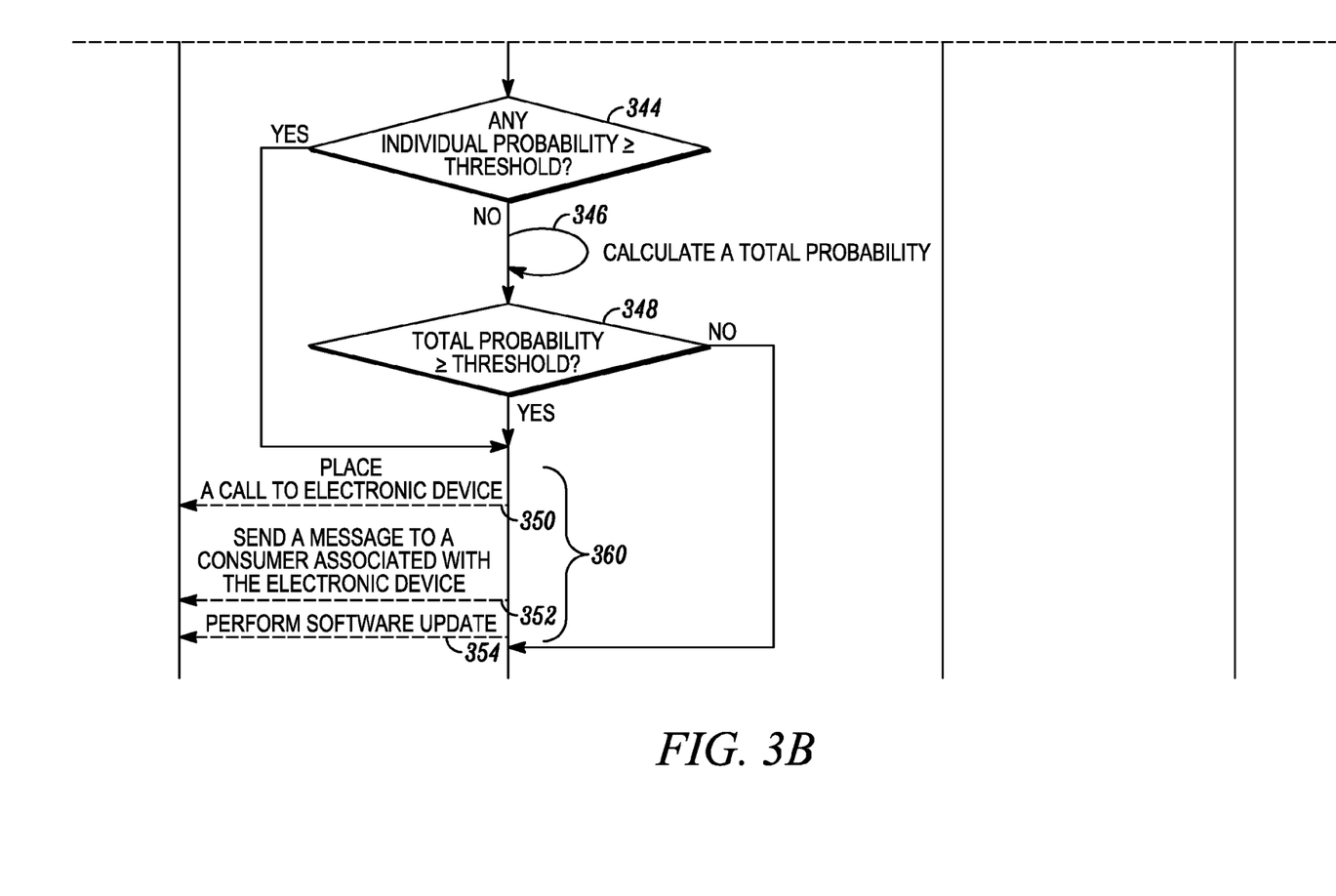

Referring now to aspects of analysis, FIGS. 3A and 3B illustrate techniques for reducing return occurrences. In particular, FIGS. 3A and 3B schematically illustrate an electronic device 305, an analysis function 315 of the system, a usage data function 320 of the system, and a return data function 325 of the system. It should be noted that these functions may be implemented in numerous ways and with various system architectures, servers, and other components, including without limitation those schematically illustrated in FIGS. 1 and 2, and are described functionally for didactic purposes.

As shown in FIGS. 3A and 3B, the analysis function 315 can retrieve 330 existing usage data for additional electronic devices (such as the electronic devices 110, 111, 112 as described with respect to FIG. 1) from the usage data function 320. Further, the analysis function 315 can retrieve 332, from the return data function 325, returns data associated with the additional electronic devices, where the returns data can specify any return incidents of the additional electronic devices. In embodiments, the usage data function 320 and the return data function 325 can update with new usage and return data as the new data becomes available or is received, and can automatically provide the new data to the analysis function 315.

The analysis function 315 can identify 334 various usage behaviors from the existing usage data. For example, the analysis function 315 can identify particular usage behaviors such as battery charging activity, radio power drain, display power drain, call frequency, data transfer rate, processor activity, email server connection attempts, software application activity, idle time, and other usage factors as well as region information, model information, build information, and other non-usage factors. The analysis function 315 can correlate 336 the various usage behaviors to the returns data. In embodiments, the analysis function 315 can analyze the existing usage data and the returns data to identify which aspects of the various usage behaviors (from the existing usage data) are frequently present in the devices that are returned and are not frequently present in the devices that are not returned. For example, the existing usage data can indicate that some of the returned devices had a low email server connection rate and some of the devices that were not returned had a high email server connection rate.

The analysis function 315 can calculate (338) coefficients for the various usage behaviors. In embodiments, the coefficients can be based on metrics or parameters of the various usage behaviors in the existing user data and can be calculated according to any model, technique, equation, and/or the like. For example, a coefficient for battery charge activity can be calculated or scaled such that a high amount of battery charges has a corresponding high probability of return and a low amount of battery charges has a corresponding low probability of return. In some embodiments, the analysis function 315 can repeat the functionalities of 336 and 338 according to pattern consistency or inconsistency (e.g., a lot of calls one day and not a lot of calls the next day), if new usage data is received, or in other cases. In some cases, if the usage data indicates consistent recurring patterns (and the returned devices also exhibit these recurring patterns), the analysis function 315 can update the corresponding coefficient accordingly. In other cases, only one occurrence of a particular usage (e.g., low application usage) can result in a high probability of return coefficient.

The electronic device 305 can send 340 usage data to the analysis function 315, the usage data corresponding to usage of the electronic device 305. The analysis function 315 can identify 341 portions of the received usage data that align with the various usage behaviors identified in 334. The analysis function 315 can calculate 342 metric values for the received usage data using the coefficients calculated in 338. In embodiments, the analysis function 315 can multiply particular usage data for a usage behavior (e.g., 120 hours of idle time over the past 6 days) by the corresponding coefficient to estimate a relative probability of return for that particular usage behavior. The analysis function 315 can determine 344 whether any individual probability meets or exceeds a threshold probability. For example, an individual probability of 0.8 for the processor activity usage exceeds a threshold single-factor probability of 0.75.

If no individual probability meets or exceeds its corresponding single-factor threshold probability ("NO"), the analysis function 315 can calculate 346 a total probability. In embodiments, the analysis function 315 calculates the total probability by adding together the weighted individual probabilities for the individual usage behaviors. The analysis function 315 can determine 348 whether the total probability meets or exceeds the cumulative threshold probability. In embodiments, an administrator can set the threshold probability such that meeting or exceeding the threshold probability can result in the analysis function 315 contacting the electronic device 305. Accordingly, if the total probability (or any of the individual probabilities) meets or exceeds the threshold probability ("YES"), the analysis function 315 can optionally contact 360 the electronic device 305 in an attempt to resolve a difficulty, problem, or condition associated with the electronic device 305 and/or operation of the electronic device 305.

In some cases, the analysis function 315 can optionally place a call 350 to the electronic device 305, such as if the electronic device 305 is a smartphone or similar device. In other cases, the analysis function 315 can optionally send 352 a message to a consumer associated with the electronic device 305 or to the electronic device 305 itself. For example, the analysis function 315 can send an email, an SMS/MMS, a notification, and/or any other type of message or data communication. In further cases, the analysis function 315 can optionally perform 354 a software update on the electronic device 305, such as via an over-the-air upgrade, flashing a custom ROM or update patch, or other software installations.

Figure 4:
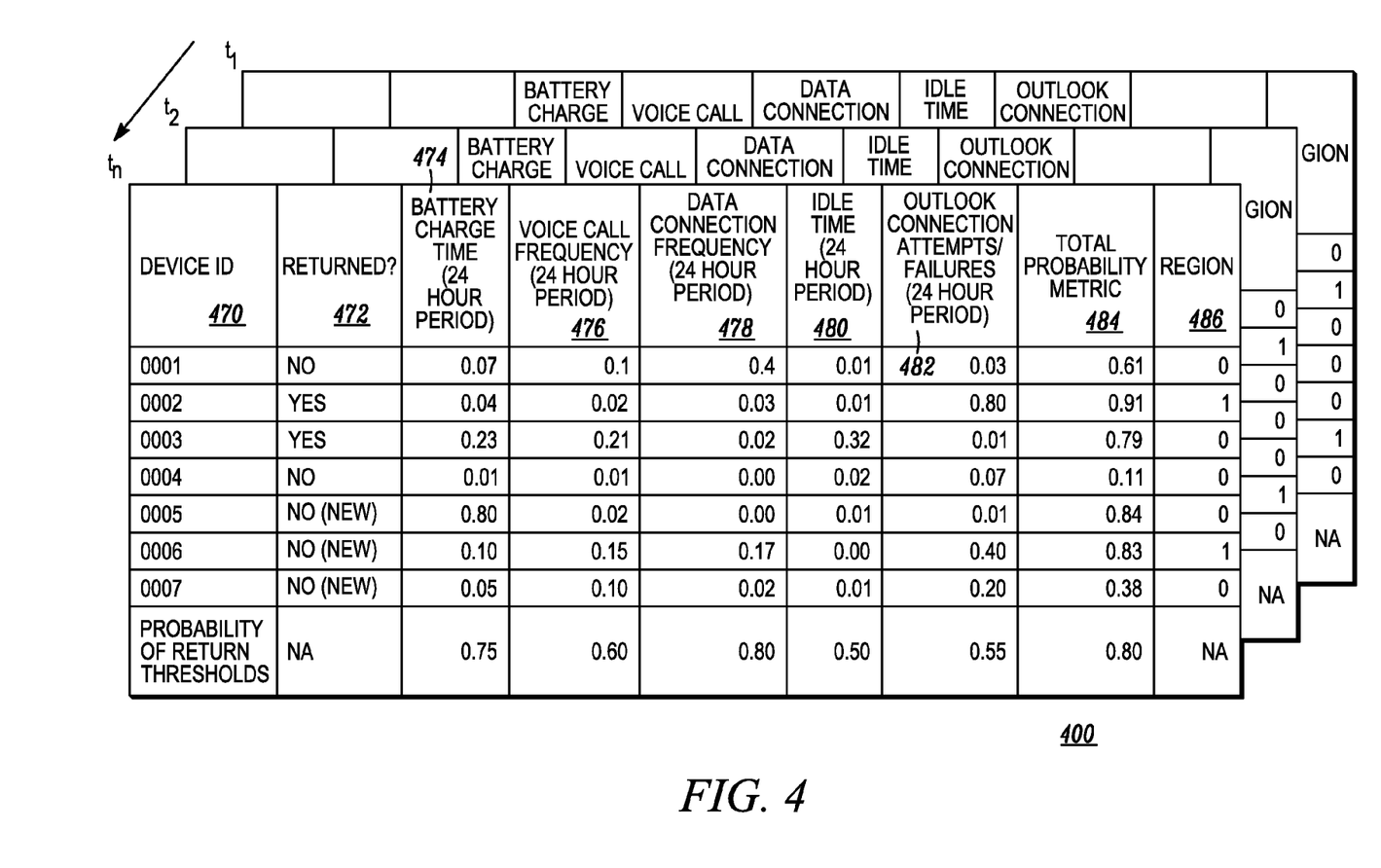
FIG. 4 is an example chart including various device probabilities based on usage data in accordance with some embodiments.

Referring to FIG. 4, a time-series chart 400 is depicted including various device usage data and calculations thereof. It should be appreciated that the chart 400 is merely an example and can include other parameters, data, and calculations. The chart 400 may be temporally updated (as illustrated in FIG. 4 by an initial chart $t_1$, a second chart $t_2$ and a current chart $t_n$) within a predetermined period of time, such as for example, every 24 hours, or even instantaneously or as close to real time as possible. The result will be a time-series of chart data that can be used for analysis and threshold determination as described herein. This temporal aspect allows for consideration and treatment of one or more characteristics or data values over a given period of time.

As shown in FIG. 4, the chart 400 includes a device ID column 470 that identifies the respective electronic devices in an anonymous manner and a returned column 472 that identifies whether the respective electronic device has been returned. There are four (4) devices in the chart 400 that correspond to existing usage data (Devices 0001-0004) and three (3) devices in the chart 400 that correspond to usage data received from electronic devices that (presumably) have not yet been returned (Devices 0005-0007). As usage data is received from the respective electronic devices, the chart is updated within a predefined period of time $t_n$.

The chart 400 includes additional columns (474, 476, 478, 480, and 482) that correspond to example types of usage factors indicated by usage data, and a region code in column 486. In embodiments, the analysis function (such as FIGS. 3A and 3B element 315) can calculate the data values of these columns by multiplying manipulated portions of the usage data that correspond to the specific types of usage factors by a set coefficient. For example, referring to the battery charges column 474, suppose that the usage data of Device 0003 indicates that the device has been charged 23 hours in a 10-day span, for an average of 2.3 hours per day. Further, the coefficient for the battery charges column 474 can be set at 0.1; accordingly, the battery charges data value for Device 0003 is 0.23 (i.e., 2.3 multiplied by 0.1). The analysis function can similarly calculate the other data values for the other devices and for the other columns 476, 478, 480, and 482. In embodiments, the analysis function can calibrate or calculate the coefficients for the columns 474, 476, 478, 480, and 482 based on an analysis of whether the devices are returned in combination with any technique, model, analysis, or the like. Further, the analysis function can update the coefficients at any time, such as when new returns data and/or usage data is received.

The chart 400 further includes a total probability metric column 484 that corresponds to a probability of return for a corresponding device, which in a particular embodiment is a weighted sum of the individual probabilities for each data point or characteristic. In other embodiments, a more complex equation may be employed in lieu of a weighted sum to provide a total probability metric for each device. A probability of return threshold may be established for the total probability metric and used as the primary trigger for interaction with the particular device or user of the device, such as through the customer service function described herein. In the exemplary chart 400 in FIG. 4, the probability of return threshold for the total probability metric is set at 0.80, such that if the total probability metric for a particular device equals or exceeds this threshold, interaction will be triggered.

As deduced from FIG. 4, in addition to the total probability metric, each of the data values for columns 474, 476, 478, 480, and 482 can exceed an individual probability of return threshold, which may also trigger an interaction depending on configuration. Each of the appropriate data columns in FIG. 4 has an individual probability of return threshold, such as, for example, battery charge time within a 24-hour period, which has a threshold of 0.75, or voice call frequency within a 24-hour period, which has a probability of return threshold of 0.60. In some embodiments, if one or more of these individual thresholds are met or exceeded, an interaction may be triggered as well. In some embodiments, threshold priorities may be set, or an algorithm or business rules may be applied to determine whether one or more individual probability thresholds will trigger an interaction when compared to the total probability threshold.

Additionally, with respect to the individual and total probability thresholds, triggers for interaction may be further defined temporally in the time series of relevant data. For example, it may be desirable to define a trigger event only when the battery charge time within a 24 hour period has met or exceeded its individual probability of return threshold for seven days in a row. As a further example, it may be desirable to define a trigger event if the total probability metric threshold has been met or exceeded for a predetermined period of time to provide some temporal stability to the metric.

As discussed herein, Devices 0005, 0006, 0007 can correspond to devices for which usage data is newly or recently received, and therefore have not yet been returned. The analysis function can examine the probability metrics of Devices 0005, 0006, 0007 to determine which of the devices to contact in an attempt to prevent a return of the device. As shown in FIG. 4, Devices 0005 and 0006 have a total probability metric that exceeds 0.75. Accordingly, the analysis function may contact Devices 0005 and 0006 via the techniques and channels as discussed herein, depending on the trigger configuration. In embodiments, the analysis function can update the data values for any of the devices as updated or new usage data is received, and the analysis function can determine if a probability metric for an associated device meets or exceeds the probability threshold as a result of the updated data values.

Figure 5:
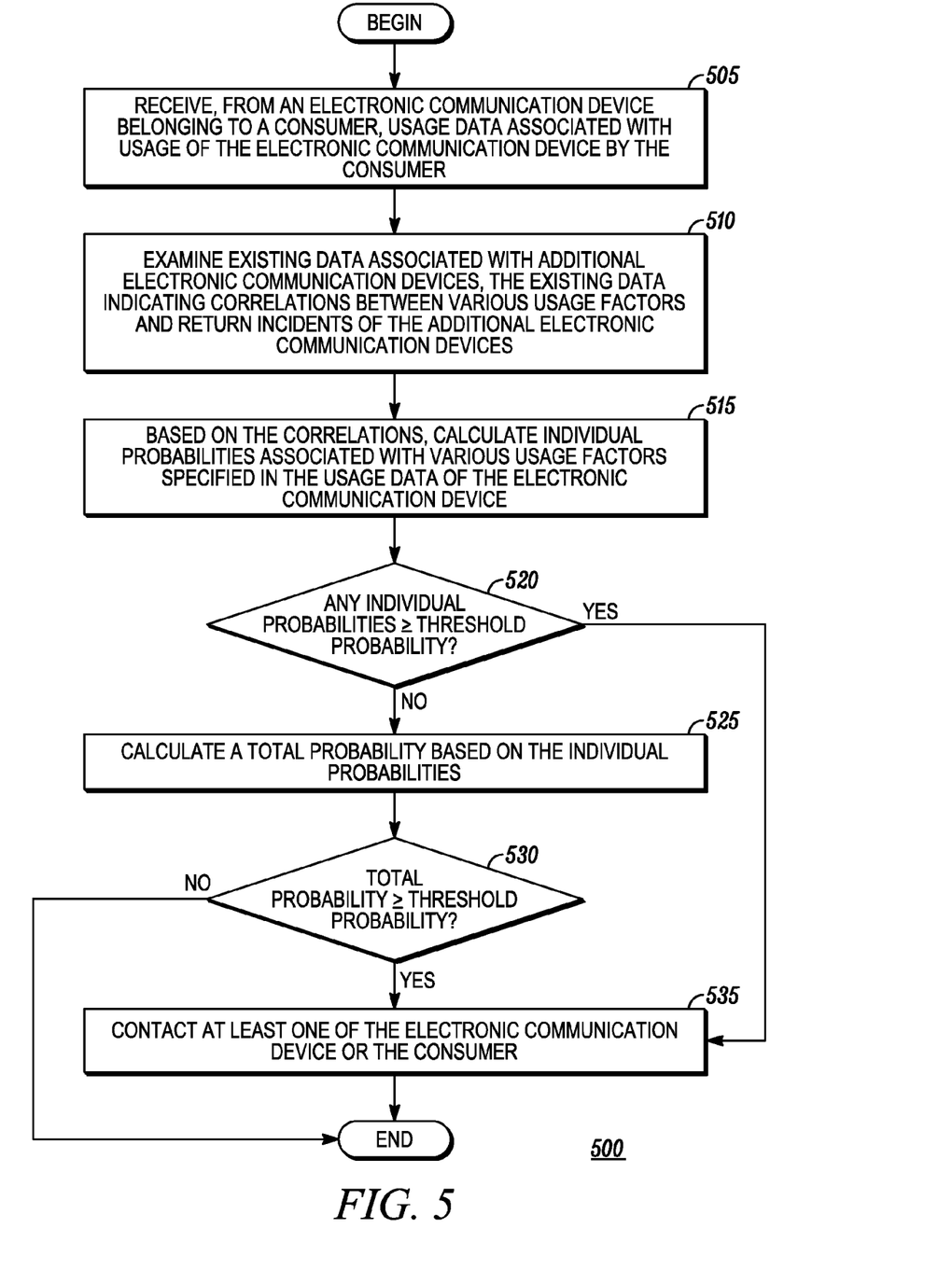
FIG. 5 depicts a flow diagram of reducing return occurrences in accordance with some embodiments.

FIG. 5 is a flowchart of a method 500 for a server device (such as the analysis server 115 as described with respect to FIG. 1) to reduce return occurrences. More particularly, the method 500 relates to calculating probabilities of return based on correlations between existing usage data and return incidents.

The method 500 begins with the server device receiving 505, from an electronic communication device belonging to a consumer, usage data associated with usage of the electronic communication device by the consumer. In embodiments, the usage data can be received and updated on a periodic or "as triggered" basis. The server device examines 510 existing data associated with additional electronic communication devices, the existing data indicating correlations between various usage factors and return incidents of the additional electronic communication devices. In embodiments, the various usage factors can include battery charging activity, radio power drain (idle and/or active), display power drain (idle and/or active), call frequency, data transfer rate, processor activity, email server connection attempts, software application activity, idle time, and other usage factors as well as region information, model information, build information, and other relevant non-usage factors. Further, each of the various usage factors can have an associated coefficient that can be used to calculate an associated probability of return for that particular usage factor.

Based on the correlations, the server device calculates 515 individual probabilities associated with various usage factors specified in the usage data of the electronic communication device. In particular, the server device can identify the various usage factors in the usage data of the electronic communication and data thereof (e.g., 5 telephone calls made in a 7-day period), and can combine this data (e.g., by multiplying) with the associated coefficients for the particular usage to calculate the individual probabilities. The server device determines 520 if any individual probabilities meet or exceed a threshold probability. For example, a calculated individual probability of 0.8 for idle time exceeds a threshold single-factor probability of 0.75. If none of the individual probabilities meet or exceed the single-factor threshold probability ("NO"), the server device calculates 525 a total probability for a device using calculations based on two or more of the individual probabilities. In embodiments, the server device calculates the total probability by a weighted summing of the individual probabilities, or according to other calculations.

The server device determines 530 if the total probability meets or exceeds the threshold probability. If the total probability does not meet or exceed the threshold probability ("NO"), processing can end, repeat, or return to any previous functionality. If either any individual probabilities or the total probability metric meets or exceeds the threshold probability ("YES"), the server device contacts 535 at least one of the electronic communication device or the consumer. In embodiments, the server device can contact the electronic communication device or the consumer via a telephone call, a message, a remote software update, or other channels as discussed herein.

Figure 6:
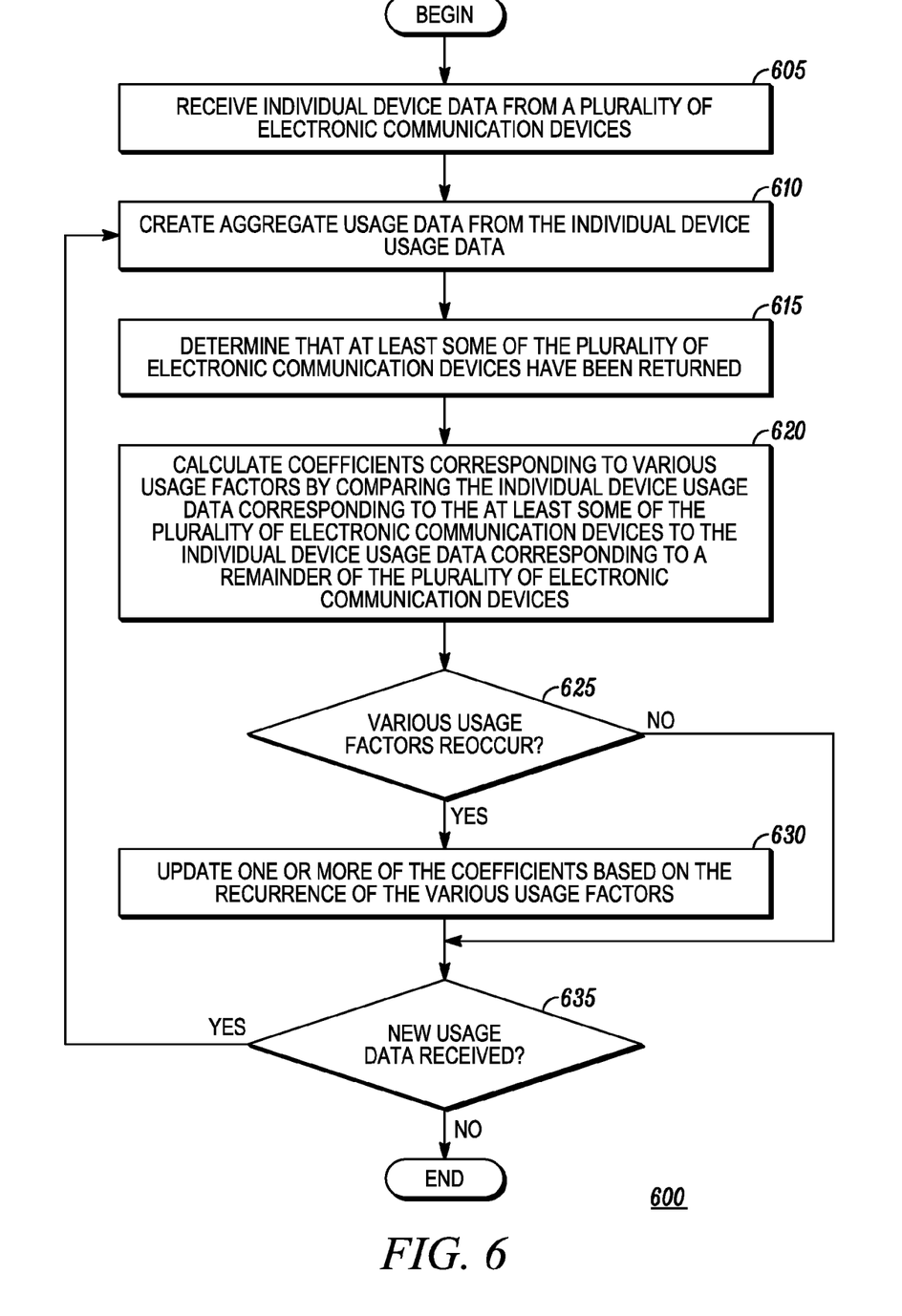
FIG. 6 depicts a flow diagram of calculating return probabilities in accordance with some other embodiments.

FIG. 6 is a flowchart of a method 600 for a server device (such as the analysis server 115 as described with respect to FIG. 1) to calculate return probabilities. More particularly, the method 600 relates to calculating coefficients for various factors that can be used to estimate the probability that a consumer will return an electronic communication device.

The method 600 begins with the server device receiving 605 individual device data from a plurality of electronic communication devices. In embodiments, the individual device data can include indications of return incidents of some of the electronic communication devices, or the server device can separately receive the return incident data. The server device creates 610 aggregate usage data from the individual device usage data. In embodiments, the server device can aggregate the usage data according to various usage factors. The server device determines 615 that at least some of the plurality of electronic communication devices have been returned via, for example, examining the return incident data from a return data function (such as FIGS. 3A and 3B element 325).

The server device calculates 620 coefficients corresponding to various usage factors by comparing the individual device usage data corresponding to at least some of the plurality of electronic communication devices to the individual device usage data corresponding to a remainder of the plurality of electronic communication devices. In embodiments, the server device can calculate and/or scale the coefficients according to the various usage data itself as well as the return incidents. For example, if the usage data indicates that fewer than 2 application downloads in a month-long time period has a particular probability of return, the server device can calculate the corresponding coefficient for this particular use according to this application download metric.

The server device determines 625 if various usage factor values reoccur. In embodiments, the usage data can indicate that particular usage factor values repeat over a determined time period, which can indicate that the associated consumer is having trouble operating the associated electronic communication device. If the server device determines that the various usage behaviors reoccur ("YES"), the server device updates 630 one or more of the coefficients based on the recurrence of the various usage factors. For example, usage data indicating that a particular electronic device experiences email server connection failures for two days followed by email server connection successes for the rest of the time can signify a lower probability of return for that electronic communication device. If the various usage behaviors do not reoccur or if the server device analyzes all of the usage data ("NO"), the server device determines 635 if new usage data is received. In embodiments, the server device can receive new usage data on a periodic or "as requested" basis when the electronic communication devices are used. If new usage data is received ("YES"), processing can return to 610 where the server device can update the aggregated usage data.

Figure 7:
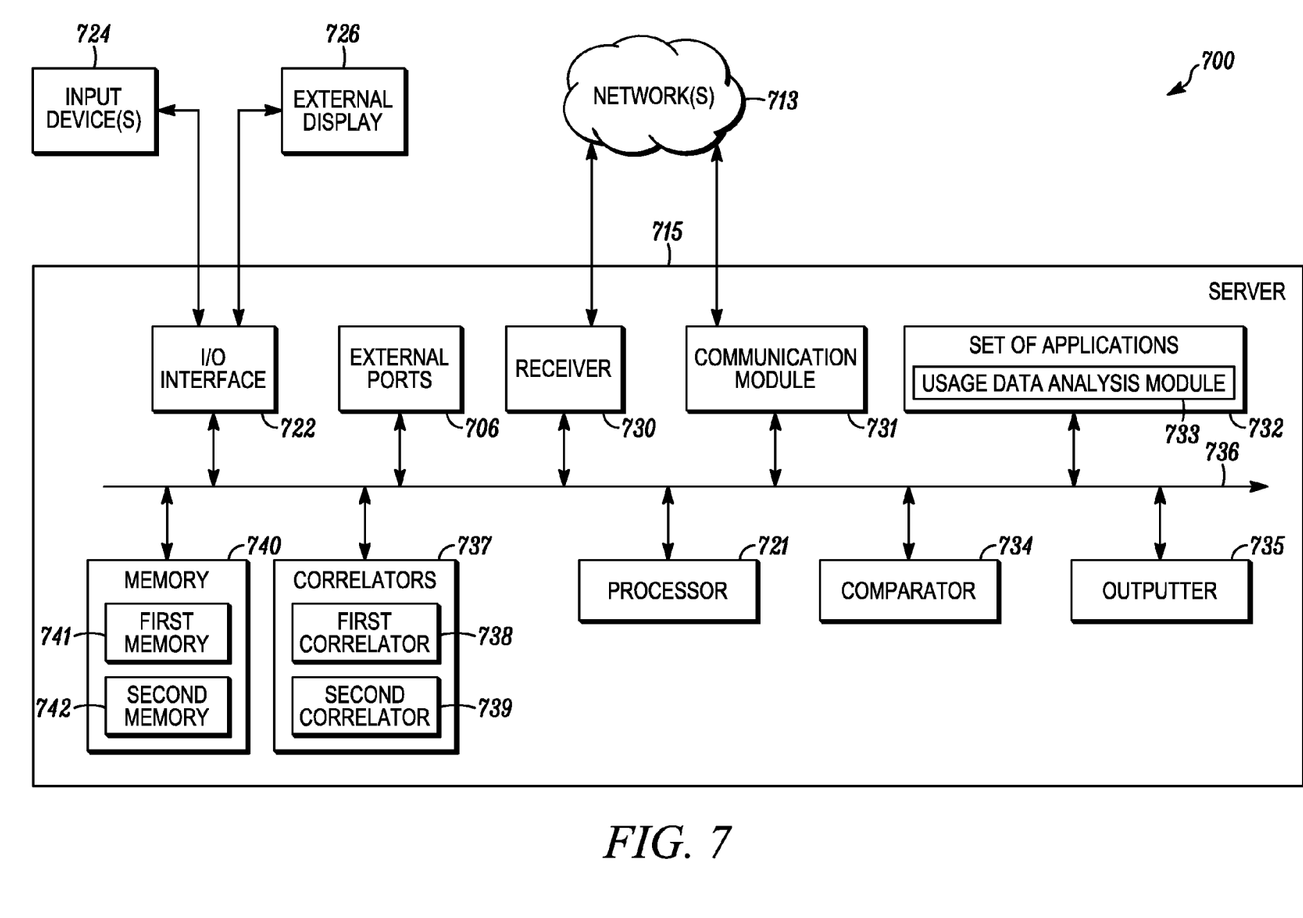
FIG. 7 is a block diagram of a server device in accordance with some embodiments.

FIG. 7 illustrates an example computing system 700 in which the embodiments may be implemented. The computing system 700 can include a server 715 having a combination of hardware and software components. Particularly, the server 715 includes a processor 721, memory 740 (e.g., hard drives, flash memory, MicroSD cards, and others) having a first memory 741 and a second memory 742, and one or more external ports 706 (e.g., Universal Serial Bus (USB), HDMI, IEEE 1394 (Firewire), and/or others). The server 715 can further include a communication module 731 configured to interface with the one or more external ports 706 to communicate via one or more wired or wireless networks 713 such as, for example a wide area network (WAN), local area network (LAN), personal area network (PAN), and/or others. For example, the communication module 731 can include one or more transceivers functioning in accordance with IEEE standards, 3GPP standards, or other wired or wireless communication standards, and configured to receive and transmit data via the one or more external ports 706. The components of the server 715 are capable of communicating with each other via a communication bus 736.

The server 715 can further include an input/output (I/O) interface 722 capable of communicating with one or more input devices 724 (e.g., keyboard, mouse, touchscreen, etc.) and an external display 726. The external display 726 and the input devices 724 are configured to interface with an operator and together may be considered to form portions of a user interface (e.g., portions of the computing system 700 associated with presenting information to a user and/or receiving inputs from a user) for a customer service operation (such as FIG. 2 element 272).

As shown in FIG. 7, the server 715 can further include a set of applications 732 that are configured to interface with other components of the computing system 700 to facilitate the functionalities of the systems and methods as described herein. Particularly, the set of applications 732 can include a usage data analysis module 733 that can be capable of examining and analyzing usage data to calculate coefficients, calculate probabilities of return, and perform other functionalities. The usage data analysis module 733 can interface with correlators 737 (including a first correlator 738 and a second correlator 739) and a comparator 734 to perform various functionalities and calculations.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 721 (e.g., working in connection with an operating system) to implement a user interface method as described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Thus, it should be clear from the preceding disclosure that the systems and methods reduce instances of consumers returning purchased devices. The systems and methods advantageously allow companies and enterprises to proactively contact consumer devices that exhibit patterns and usage behaviors indicating a likelihood that the consumers will return the devices. Further, the systems and methods advantageously enable the consumers to receive support for or updates to a device without having to return or exchange the device.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A computerized method in a server device for predicting device return, the method comprising:
retrieving, from memory, a set of device data associated with each of a plurality of electronic communication devices belonging to a plurality of consumers, each of the set of device data including (i) usage factors of the corresponding electronic communication device, and (ii) whether a return incident occurred for the corresponding electronic communication device;
correlating, by a processor as a set of stored correlations, the return incidents of the plurality of electronic communication devices to a portion of the usage factors of the plurality of electronic communication devices;
calculating, based on the set of stored correlations, a set of coefficients respectively associated with the portion of the usage factors;
receiving, from an electronic communication device belonging to a consumer different from the plurality of consumers, a usage data set associated with usage of the electronic communication device by the consumer;
identifying, from a first portion of the usage data set a first usage factor of the portion of the usage factors correlated to the return incidents of the plurality of electronic communication devices;
identifying, from a second portion of the usage data set, a second usage factor of the portion of the usage factors correlated to the return incidents of the plurality of electronic communication devices;
calculating (i) a first individual return probability for the first usage factor based on the first portion of the usage data set and a first coefficient of the set of coefficients associated with the first usage factor, and (ii) a second individual return probability for the second usage factor based on the second portion of the usage data set and a second coefficient of the set of coefficients associated with the second usage factor;
calculating, based on the first individual return probability and the second individual return probability, a probability that the consumer will return the electronic communication device;
determining that the probability is greater than a threshold probability; and
in response to determining that the probability is greater than the threshold probability, remotely installing software code on the electronic communication device, wherein the software code comprises an upgrade or an update patch.

2. The method of claim 1, further comprising:
determining that the consumer did not return the electronic communication device; and
updating the set of stored correlations to reflect that contacting the consumer resulted in the consumer not returning the electronic device.

3. The method of claim 1, wherein the usage data indicates at least one of:
battery charging activity, radio power drain, display power drain, call frequency, data transfer rate, processor activity, email server connection attempts, software application activity, idle time, region information, model information, or build information.

4. A server device for predicting device return, the server device comprising:
a communication module configured to communicate with electronic devices via at least one network connection;
a memory storing (i) a set of computer-executable instructions, and (ii) a set of device data associated with each of a plurality of electronic communication devices belonging to a plurality of consumers, each of the set of device data including (i) usage factors of the corresponding electronic communication device, and (ii) whether a return incident occurred for the corresponding electronic communication device; and
a processor interfacing with the communication module and the memory, and configured to execute the computer-executable instructions to cause the processor to:
correlate, as a set of stored correlations, the return incidents of the plurality of electronic communication devices to a portion of the usage factors of the plurality of electronic communication devices,
calculate, based on the set of stored correlations, a set of coefficients respectively associated with the portion of the usage factors, receive, via the communication module from an electronic communication device belonging to a consumer different from the plurality of consumers, a usage data set associated with usage of the electronic communication device by the consumer, identify, from a first portion of the usage data set, a first usage factor of the portion of the usage factors correlated to the return incidents of the plurality of electronic communication devices, identify, from a second portion of the usage data set, a second usage factor of the portion of the usage factors correlated to the return incidents of the plurality of electronic communication devices, calculate (i) a first individual return probability for the first usage factor based on the first portion of the usage data set and a first coefficient of the set of coefficients associated with the first usage factor, and (ii) a second individual return probability for the second usage factor based on the second portion of the usage data set and a second coefficient of the set of coefficients associated with the second usage factor, calculate, based on the first individual return probability and the second individual return probability, a probability that the consumer will return the electronic communication device, determine that the probability is greater than a threshold probability, and in response to determining that the probability is greater than the threshold probability, remotely install software code on the electronic communication device via the communication module, wherein the software code comprises an upgrade or an update patch.

5. The server device of claim 4, wherein to calculate the first individual return probability, the processor is configured to multiply (1) data associated with the first portion of the usage data set with (2) the first coefficient associated with the first usage factor.

6. The server device of claim 4, wherein the processor is further configured to execute the computer-executable instructions to further cause the processor to:
 identify recurrences of the usage factors in the set of device data, and
 update the set of coefficients respectively associated with the portion of the usage factors based on the recurrences.

7. The server device of claim 4, further comprising:
 a user interface;
 wherein the processor is further configured to execute the computer-executable instructions to further cause the processor to:
  cause the user interface to present a graphical representation of the probability.

8. The server device of claim 4, wherein to correlate the return incidents, the processor is configured to:
 identify at least one of the usage factors as associated with at least some of the return incidents.

* * * * *

UNITED STATES PATENT AND TRADEMARK OFFICE
CERTIFICATE OF CORRECTION

PATENT NO. : 9,852,433 B2
APPLICATION NO. : 13/923605
DATED : December 26, 2017
INVENTOR(S) : Neal H. Patel et al.

Page 1 of 1

It is certified that error appears in the above-identified patent and that said Letters Patent is hereby corrected as shown below:

On the Title Page

At item (72), Line 2, "Hal R" should be -- Hal R. --.

At item (72), Line 3, "Jeffrey D" should be -- Jeffrey D. --.

Signed and Sealed this
Twenty-fourth Day of July, 2018

Andrei Iancu
*Director of the United States Patent and Trademark Office*